United States Patent Office 3,072,630
Patented Jan. 8, 1963

3,072,630
POLYMERIZATION OF ETHYLENE USING COORDINATION CATALYST SYSTEM WITH A HALIDE PROMOTOR
Jan Ide de Jong, Landenburg, Pa., and Leo Walter Safranski, Wilmington, Del., assignors to E. I. du Pont de Nemours and Company, Wilmington, Del., a corporation of Delaware
No Drawing. Filed Mar. 8, 1955, Ser. No. 493,056
13 Claims. (Cl. 260—94.9)

This invention relates to a polymerization process which is highly valuable for the production of solid ethylene polymers and copolymers, and particularly to promoters in polymerization reactions.

Heretofore it had been known that ethylene can be converted to solid polymers under very high pressures in the presence of catalysts which are capable of yielding free radicals under polymerization conditions. Recently a novel polymerization catalyst has been described in copending application S.N. 450,243, filed August 16, 1954, in which a reduced titanium complex is disclosed as a catalyst which produces extremely high molecular weight substantially unbranched polymers and copolymers of ethylene. This active titanium complex is formed by reducing a tetravalent or trivalent salt or ester to a valence state below three, and combining the reduced product with an ethylenically unsaturated hydrocarbon. The initiator thus formed is effective for the polymerization of said unsaturated hydrocarbon to high molecular weights. This type of catalyst has been called a coordination catalyst or initiator, because it is believed that the reduced titanium will coordinate with the ethylenically unsaturated hydrocarbon and cause polymerization. The reduction of the tetra- or trivalent titanium to a valence state below three is accomplished by strong reducing agents such as organometallic compounds, metal hydrides, Grignard reagents and metals such as zinc and metals above zinc in the electromotive series. The polymers obtained by this type of polymerization are characterized by their linear structure. The linear polyethylene thus obtained has virtually no side branches such as methyl substitution, and a very small number of vinylidene groups, and has furthermore a higher density than polymers made by well-known polymerization processes. The coordination initiators have been found to be useful over a wide range of temperature and pressure including room temperature and atmospheric pressure and is, therefore, a highly valuable system for polymerizing ethylene. High rates of polymerization are obtained when organometallic compounds such as lithium aluminum tetraalkyls are employed as reducing agents. Although the quantity of reducing agents to the titanium compound may be varied significantly, it has been found that in general high ratios of the reducing agent to the titanium compound result in high polymerization rates. However, it would be desirable to use lower ratios, since high ratios increase the difficulty of purifying the product, and can cause the formation of low molecular weight products at high polymerization temperatures.

It is, therefore, the objective of this invention to provide an improved polymerization process for the polymerization of ethylene. A further objective is to provide a highly active coordination catalyst system. Another object is to prepare linear solid polymers of ethylene. Further objects will become apparent hereinafter.

The objects of this invention are accomplished by the addition of small quantities of hydrogen halide or of a halohydrocarbon, such as of an alkyl or aryl halide, to the coordination initiator system comprising a tetravalent titanium salt or ester and a reducing agent such as an organo metallic or Grignard compound. It has now been discovered that by the addition of one or more of the hereinabove described compounds, the polymerization rate is increased as much as four fold and the amount of polymer produced is increased approximately four fold. It is believed that the promoting effect of the halides used in the present invention is due to the mild oxidative properties of said compounds, which when used in combination with the titanium and the reducing agent form an initiating system improved in efficiency over an initiating system containing only the titanium compound and the reducing agent. It is believed that possibly a redox system is involved in the initiator system of the present invention.

The promoters used in the present invention as described hereinabove, are hydrogen halides or halohydrocarbons free of non-aromatic unsaturation. Suitable examples of such compounds include hydrogen chloride, butyl chloride, phenyl bromide, among others. Besides hydrogen halide, it is in general preferred to use the lower alkyl halides, such as alkyl halides having less than 10 carbon atoms and the unsubstituted monoaromatic halides such as the phenyl halides, for reasons of lower cost, availability, and their solubility in the polymerization media. Of the halide radicals themselves, the bromides and chlorides are preferred. The quantity in which these promoters are used may be varied over a wide range. However, there exists an upper limit of the amount of promoter that can be added. This is understandable in view of the explanation set forth hereinabove, in that too large a quantity of the oxidizing agent may either inhibit the formation of the complex containing the titanium at the valence state below three or cause the oxidation of the reduced active titanium to a higher inactive valence state. The limit has been found to vary with the individual promotor, and is believed to be in accord with the oxidation potential of that promoter. For purposes of this invention, it has been found that quantities from 1 to 100 times and preferably from 1 to 10 times the molar quantity of the titanium compound of the promoter will give the desired increase in polymerization rate and the increase in overall weight of polymer produced.

The polymerization reaction is preferably carried out in an inert liquid reaction medium, such as a saturated hydrocarbon or an aromatic hydrocarbon. Preferred reaction media are benzene, toluene and cyclohexane or higher boiling saturated hydrocarbon liquids. To achieve a rapid formation of the catalytically active complex, it is preferred to employ solutions of the catalyst components in the reaction medium. The activators used in the present invention are generally miscible with the reaction media. The formation of the active complex may be carried out prior, during, or after the addition of the monomer. In general, it is preferred to add the solution of the tetravalent titanium compound just prior to the addition of the monomer to the solution of the reducing agent. A surprising feature of this invention is that the promoter may be injected into the polymerization medium at the start of the polymerization as well as during, or at the end of, the polymerization. Thus, the polymerization may be carried out in the absence of the activator until it is noted that the rate of polymerization is significantly decreased. Injection of the promoter at such a point will then cause a rapid increase in the rate of polymerization. This operation may be repeated several times, and thereby increasing the yield of polymer substantially. Addition of the activator at the start of the polymerization will cause, in addition to the increased yield, a significant increase in polymerization rate, as mentioned hereinabove. The pressure to be employed in the polymerization using the present coordination initiator system may be varied over a wide range from atmospheric pressure to very high pressures of 1000 atmospheres and above. Generally, however, pressures from 100 p.s.i. to 15,000 p.s.i. of ethylene are employed in order to facilitate the handling of ethylene and avoid expensive super-pressure equipment. The temperatures useful in the process of this invention are within the range of about 0 to 300° C., and preferably from 20 to 200° C.

The polymerization of ethylene according to the process of this invention takes place most satisfactorily when the polymerization mixture is substantially moisture-free and also free of other sources of hydroxyl groups, since hydroxyl groups will destroy the catalytic activity of the chain-growing nucleus. As in numerous other ethylene polymerization processes, the polymerization mixture in the process of the present invention is preferably kept free of oxygen and carbon dioxide, since these compounds can react with the initiator.

The process of the present invention is not limited to any particular reducing agent used in combination with the titanium compounds as shown by the examples hereinbelow. As disclosed in S.N. 450,243, the reduction of the titanium to a valence state below three is accomplished by such reducing agents such as organometallic compounds, Grignard reagents, metal hydrides and metals such as zinc and above zinc in the electromotive series. The promoters of the present invention have a more pronounced effect on the polymerization of ethylene with coordination initiators if very strong reducing agents are used or a high ratio of reducing agent to the titanium compound is employed.

In employing the polymerization process of the present invention, tetravalent or trivalent titanium salt and esters may be employed generally, although the halides and specifically titanium tetrachloride is preferred.

The coordination initiator system has hereinabove been described with reference to titanium compounds, which are reduced to a valence state below 3 to form the chain generating nucleus on coordination with ethylene. The ability of the titanium to exist in such a valence state as to cause the polymerization of ethylene to solid polymers is not unique, but has also been found in other metals such as zirconium, vanadium, tungsten, and molybdenum. The initiating ability of the above said metals to polymerize ethylene when reduced to a valence state below 3 has been described in the following applications respectively, S.N. 450,268, filed August 16, 1954; S.N. 455,357, filed September 10, 1954, now abandoned; S.N. 453,145, filed August 30, 1954; S.N. 453,146, filed August 30, 1954.

In general it has been found that the coordination initiators can be formed with transition metals of groups III$b$ to VI$b$ of the periodic table. The degree of catalytic activity may vary with each of these metals, the more active ones being the metals listed hereinabove. Thus, the term coordination catalyst is to be construed as applying to the above listed metals, which are capable of coordinating with ethylene and causing polymerization when existing in an active valence state. The promoters used in the present invention can also serve in an analogous manner in a coordination initiator system using a metal compound of the metals described hereinabove and a reducing agent, capable of reducing the metal to a valence state below three. The same conditions and limitations discussed hereinabove for the polymerization of ethylene using a titanium complex also apply to metals other than titanium useful in the present invention.

The process of this invention is further illustrated by the following examples. In these examples, only microquantities of initiator were used under mild conditions so as to determine the effect of the present activators on the polymerization of ethylene more accurately. If large quantities of the initiator are used, it is difficult to follow the rate of polymerization of ethylene which is measured by the adsorption of the ethylene in the polymerization vessel. It is to be understood, however, that with larger quantities of the initiator the quantity of polymer polymerized is increased to the same degree.

*Example I.*—Into a reaction flask was added 100 ml. of decahydronaphthalene containing $4.38 \times 10^{-5}$ moles of titanium tetrachloride. The reaction vessel was heated to 100° C., flushed with ethylene and $17.7 \times 10^{-5}$ moles of lithium aluminum tetraoctyl dissolved in 3.0 ml. of decahydronaphthalene was injected into the reaction mixture. The polymerization was allowed to proceed under continuous agitation at atmospheric pressure in an atmosphere of ethylene. After 1 hour, the rate of polymerization had decreased from 2 to 0.3 ml./min. Thereupon $5.7 \times 10^{-3}$ moles butylchloride was injected into the reaction mixture and the rate of polymerization increased from 0.3 ml./min. to 1.2 ml./min. The washed and dried product was a solid white polymer that could be molded into a tough flexible film by heating to 265° C. and pressing under 20,000 p.s.i. for a period of 2 minutes.

*Example II.*—Into a reaction flask was charged 100 ml. of decahydronaphthalene having therein dissolved $$6.35 \times 10^{-5}$$

moles of titanium tetrachloride. The reaction vessel was heated to 100° C., was flushed with ethylene and $26.5 \times 10^{-5}$ moles of lithium aluminum tetraoctyl dissolved in 4.5 ml. of decahydronaphthalene was injected into the reaction mixture. The polymerization was allowed to proceed under continuous agitation at atmospheric pressure maintained by the ethylene monomer. After 35 minutes, the rate of polymerization reached approximately zero having adsorbed 80 ml. of ethylene. $4.57 \times 10^{-4}$ moles of butylchloride was then injected into the reaction mixture. The rate of polymerization increased rapidly from almost zero to 1.8 ml./min. and took up an additional 160 ml. ethylene gas by the time the rate of polymerization had again decreased to 1 ml./min. at which point the polymerization reaction was stopped by venting off the excess ethylene gas. On washing and drying the product, a white solid polymer was obtained. The polymer was similar to the one described in Example I.

*Example III.*—To a reaction flask was added under a blanket of ethylene $17.7 \times 10^{-5}$ moles of lithium aluminum tetraoctyl and $4.57 \times 10^{-4}$ moles of butylchloride and the resulting reaction mixture was heated to 100° C. Into the reaction mixture was then injected $4.38 \times 10^{-5}$ moles of titanium tetrachloride dissolved in 100 ml. of decahydronaphthalene. The polymerization was allowed to proceed under continuous agitation at atmospheric pressure maintained by the ethylene. The reaction, although not completed, was stopped after 2⅙ hours, and after 881 ml. of ethylene had been converted into polymer. In the absence of the butylchloride the reaction stopped after having converted 230 ml. of ethylene into polymer. On washing and drying, both polymerizations gave white solid polymers weighing 1.12 grams and .21 gram respectively. The inherent viscosities of the polymer in decahydronaphthalene at 150° C. were found to be 5.2 and 3.5, respectively.

*Example IV.*—Using the procedure described in Example II, an initiator system comprising $4.5 \times 10^{-5}$ moles of titanium tetrachloride and $2.95 \times 10^{-4}$ moles of lithium aluminum tetraoctyl were employed. After 46 minutes of polymerization, when the rate of polymerization had become too small to measure, $6.04 \times 10^{-5}$ moles of HCl dissolved in 0.2 ml. of toluene was injected into the reaction mixture causing an increase in polymerization rate from zero to 1 ml./minute of ethylene.

*Example V.*—Into a pressure polymerization vessel having a capacity of 330 ml. was charged 100 ml. of benzene containing $5 \times 10^{-4}$ moles of titanium tetrachloride. To this solution was added $33 \times 10^{-4}$ moles of phenylmagnesium bromide dissolved in a minimum quantity of ethyl ether and $5 \times 10^{-4}$ moles of phenyl bromide. The reaction vessel was flushed with nitrogen and then with ethylene and the polymerization was started by heatthe mixture to 75° C. under a pressure of 500 p.s.i. of ethylene. After 1 hour of continuous agitation, while maintaining temperature and pressure, the reaction was stopped, excess monomer vented off and the resulting polymer was filtered, washed and dried. 6.1 grams of a solid white polymer was obtained. In the absence of the phenyl bromide under identical conditions only 2.1 grams of a solid polymer was obtained.

*Example VI.*—Into a pressure reaction vessel having a capacity of 330 ml. were charged 100 ml. of cyclohexane, 2.3 (0.1 mol) grams of sodium in finely divided form, and 2.7 grams (0.01 mole) of chlorotriphenyl methane. The resulting mixture was heated in the absence of oxygen to 150° C. for a period of 15 minutes under autogeneous pressure. The reaction mixture was cooled to 25° C. and the polymerization mixture was flushed with nitrogen and then with ethylene. 3.8 grams of titanium tetrachloride dissolved in 40 ml. of cyclohexane was injected into the reaction mixture and the reaction vessel was then pressured to 500 p.s.i. with ethylene and heated to a temperature of 100° C. causing the pressure to rise to 1200 p.s.i. The reaction vessel was agitated for 1 hour at that temperature. After 1 hour, the reaction vessel was cooled to room temperature, excess monomer gas vented off, and the resulting polymer was filtered, washed, and dried. A white solid polymer weighing 27.9 grams was obtained. The polymer could be molded into tough flexible films by heating to 200° C. and pressing under 20,000 p.s.i. for a period of 2 minutes. The polymerization of ethylene using the above described conditions but in the absence of chlorotriphenyl methane resulted in 6.2 grams of a solid polymer.

The products obtained by polymerizing ethylene with the catalysts hereinabove disclosed are solid polymers exclusively and are not contaminated with Friedel-Crafts type of oily polymers.

The quantity of catalyst can be varied over a rather wide range. It is desirable to employ an initiator concentration which is at least large enough to produce a reasonably rapid rate for a reasonably long period of time. Suitable, the preferred quantity is within the range of 0.1 to 10 percent based on the weight of the titanium per unit monomer. The quantities of the reducing agent and the promoter are adjusted accordingly to the quantity of titanium used. A wide ratio of reducing agent to the titanium compound may be employed. Although the optimum ratios vary with each individual reducing agent, it has been found that a molar ratio of titanium tetrahalide to the reducing agent from 0.2 to 5 will produce high rates of polymerization. The quantities of promoter to be used have been described hereinabove.

The polymers which are made under the conditions described hereinabove frequently have such tremendously high molecular weights, that removal of the catalyst by dissolving and filtering is extremely difficult. The best procedure for obtaining the polymer in a clean form is to wash with acetone-hydrochloric acid mixture in a Waring Blendor several times followed by washing with acetone, and thereafter, if necessary, followed by several acetone-aqueous sodium hydroxide washes and finally by an acetone-water wash. Other methods of purifying the polymer will occur to those skilled in the art.

Although the process of this invention has been described in reference to homopolymers of ethylene, it is to be understood that it equally well applies to the copolymerization of ethylene with comonomers such as propylene, isobutylene, and other ethylenically unsaturated monomers.

The great advantage of the present invention is that it provides a coordination initiator system of improved efficiency which increases the rate of polymerization and increases the overall yield of polymer, thereby decreasing the cost of the initiator. The present process decreases the number of initiator residues remaining in the polymer, thus facilitating the washing of the polymer. By the addition of the activators, it is further possible to control the rate of polymerization to a certain degree.

The ethylene polymers obtained in accordance with the process of this invention are highly useful in numerous applications, especially in the form of films, extruded articles, extruded insulation on wire, fibers, and filaments, etc.

We claim:

1. The process of polymerizing ethylene which comprises maintaining ethylene at a temperature of 0 to 300° C. and a pressure of 1 to 1000 atmospheres in the presence of a polymerization initiator, said polymerization initiator being the product formed by admixing a titanium halide with an organometallic compound and a compound of the class consisting of hydrogen halides, alkyl monohalides and aryl monohalides, the halogen in said halides being of the class consisting of chlorine and bromine, and recovering a polymer of ethylene.

2. The process as set forth in claim 1 wherein the compound of the class consisting of hydrogen halides, alkyl monohalides and aryl monohalides is butyl chloride.

3. The process as set forth in claim 1 wherein the compound of the class consisting of hydrogen halides, alkyl monohalides and aryl monohalides is phenyl bromide.

4. The process as set forth in claim 1 wherein the compound of the class consisting of hydrogen halides, alkyl monohalides and aryl monohalides is hydrogen chloride.

5. The process of polymerizing ethylene which comprises maintaining ethylene at a temperature of 0 to 300° C. and a pressure of 1 to 1000 atmospheres in the presence of an inert liquid hydrocarbon medium and a polymerization initiator, said polymerization initiator being the product formed by admixing a titanium halide with a reducing agent of the class consisting of organometallic compounds, Grignard reagents, and alkali metals and a compound of the class consisting of hydrogen halides, alkyl monohalides and aryl monohalides, the halogen in said halides being of the class consisting of chlorine and bromine, and recovering a polymer of ethylene.

6. The process as set forth in claim 5 wherein the titanium halide is titanium tetrachloride.

7. The process as set forth in claim 5 wherein the reducing agent is lithium aluminum tetraoctyl.

8. The process as set forth in claim 5 wherein the reducing agent is phenylmagnesium bromide.

9. The process as set forth in claim 5 wherein the reducing agent is sodium.

10. The process as set forth in claim 5 wherein the liquid inert hydrocarbon medium is decahydronaphthalene.

11. The process as set forth in claim 5 wherein the liquid inert hydrocarbon medium is cyclohexane.

12. The process of polymerizing ethylene which comprises maintaining ethylene at a temperature of 0 to 300° C. and a pressure of 1 to 1000 atmospheres in the presence of a polymerization initiator, said polymerization initiator being the product formed by admixing a halide of a transition element of groups IV*b* to VI*b* of the periodic table with a compound of the class consisting of organometallic compounds, Grignard reagents, and alkali metals and a compound of the class consisting of hydrogen halides, alkyl monohalides and aryl monohalides, the halogen in said halides being of the class consisting of chlorine and bromine, and recovering a polymer of ethylene.

13. The process of polymerizing ethylene which comprises maintaining ethylene at a temperature of 0 to 100° C. and a pressure of 1 to 1000 lbs. per square inch gauge in the presence of a polymerization initiator, said polymerization initiator being the product formed by admixing a halide of a transition element of group IV–*b* with an organometallic compound and an alkyl halide.

References Cited in the file of this patent

UNITED STATES PATENTS 2,691,647    Field et al. _____ Oct. 12, 1954
2,721,189    Anderson _____ Oct. 18, 1955